Patented Oct. 11, 1932

1,881,741

UNITED STATES PATENT OFFICE

LEON LILIENFELD, OF VIENNA, AUSTRIA

MANUFACTURE OF NEW CELLULOSE COMPOUNDS

No Drawing. Application filed May 22, 1926, Serial No. 111,036, and in Austria May 30, 1925.

This invention is an improvement in or modification of the invention described and claimed in my U. S. Patent No. 1,674,401, granted June 19, 1928 on application Ser. No. 727,805, filed July 23, 1924 and copending herewith. According to that application new cellulose derivatives are obtained by causing a compound derived from ammonia in which an alkyl, aryl or aralkyl radical is substituted for at least one hydrogen atom of the ammonia, and in which at least one hydrogen atom of the ammonia can be exchanged, to react with a cellulose-xantho-fatty acid.

According to the present invention, cellulose derivatives which are of technical value are also obtained by substituting for the cellulose-xantho-fatty acid in the process of the aforesaid patent other derivatives or compounds of cellulose which contain the group

Accordingly, there come into question as parent materials for the present invention all derivatives or compounds of cellulose which contain the group CSS, with the exception of the cellulose-xantho-fatty acids and its compounds, for example, cellulose-xanthic acids, or cellulose-xanthates (viscose), or the products which are obtainable from cellulose-xanthic acids or cellulose-xanthates with the aid of oxidising agents, for example, iodine, copper salts, potassium ferricyanide and the like, or the products of the reaction between esters of chlorocarbonic acid and cellulose-xanthic acids or cellulose-xanthates, or the esters of cellulose-xanthic acid, and the like; in general, cellulose-xanthic acids or cellulose-xanthates, or compounds or derivatives of cellulose-xanthic acids or of cellulose-xanthates, with the exception of the cellulose-xantho-fatty acids.

The mode of carrying out the process of this present invention differs from that described in the aforesaid patent only in that instead of the cellulose-xantho-fatty acid or salt or derivative thereof, or reaction mixture containing a cellulose-xantho-fatty acid or salt or derivative thereof, there is used another compound or derivative of cellulose containing the group

or a reaction mixture containing such compound or derivative of cellulose. According to their mode of formation, the products are probably N-substituted thiourethanes of the cellulose group of the type:—

R.NH.CS.O.($C_{6n}H_{10n-1}O_{5n-1}$), or
R.N:C(SH).O.($C_{6n}H_{10n-1}O_{5n-1}$).

The following examples illustrate the invention, the parts being by weight:—

Example 1.—2500 parts of a solution of viscose of 15 per cent. strength (calculated on the parent cellulose), prepared as described in Example 1 of U. S. Patent No. 1,674,401, but dissolved in such a manner that the viscose contains 15 per cent. by weight of the parent material cellulose, and corresponding with 375 parts of the parent material, are treated in a kneading machine, preferably whilst cooling, with acetic acid of 10–50 per cent. strength, added in small quantities, until neutral or faintly acid or faintly alkaline. There are then added, either immediately after the addition of the acetic acid, or after some time (for example, after half an hour or even after several hours) and advantageously gradually in small portions 112½–225 parts of aniline, or the equivalent quantity of ortho-toluidine, ortho-xylidine, aminophenol, or benzylamine, or the like. When the addition of the nitrogen-containing body is completed, the reaction mixture is further kneaded until the product of the reaction is precipitated. The rapidity with which precipitation occurs depends largely upon the nature of the nitrogen-containing base used; thus for instance, when benzylamine is used, the reaction product tends to separate after only a short time, whilst when aniline or ortho-toluidine is used, precipitation only begins after a period of 2–10 hours. Temperature also plays an important part in this respect. If the reaction mixture be strongly cooled, precipitation occurs only slowly, but more rapidly at room temperature. When precipitation is complete the mixture may if desired be subsequently kneaded for several hours or even days, and the magma is then transferred to a suitable filtering device, for example a filter, a straining-cloth, a centrifuge, a filter-press, a suction-filter or the like, and is then thoroughly washed with water. The final product may then be dissolved in its moist condition and put to the technical use for which it is intended, or it may be dried in a vacuum or in the air, if desired after treating it with alcohol, or with alcohol and then with ether.

The product is a more or less fine or sandy powder, particularly after it has been comminuted, and dissolves readily in dilute caustic alkali solution (for instance caustic soda solution of 8–10 per cent. strength). Both the body itself and its solutions in alkali solution show good tensile strength.

Solutions of the product in alkali solution, for instance, in caustic soda solutions, may be worked up into artificial products (for example, films, artificial threads or the like), layers, coatings or the like, according to the processes described in applications Ser. Nos. 727,802, filed July 23, 1924 and 111,037 filed May 22, 1926, respectively U. S. Patent No. 1,674,403 and U. S. Patent No. 1,674,404.

Obviously a more dilute viscose may be used as the starting material.

*Example 2.*—1000 parts of a viscose of 10 per cent. strength (prepared as described in Example 1 of U. S. Patent No. 1,674,401), corresponding with 100 parts of parent cellulose, are diluted with 8000 parts of water, and there are added whilst stirring or kneading, 550–600 parts of acetic acid of 10 per cent. strength. There are then added, either immediately after addition of the acetic acid, or after standing for a short or long period, 120–250 parts of aniline, and the mixture is heated on the water bath whilst stirring or shaking. Precipitation of the product occurs after a short time. Heating is continued for a few minutes, and the mixture is then allowed to stand at room temperature for 12–24 hours. The product is then separated from the mother-liquor by filtering, straining, centrifuging or the like, and is thoroughly washed with water.

The properties and solubilities of the product resemble those of the product obtained in Example 1.

*Example 3.*—1000 parts of a viscose of 10 per cent. strength (calculated on the parent cellulose), prepared as described in Example 1 or my above mentioned U. S. Patent No. 1,674,401, are diluted with 1000 parts of water, and there are added whilst stirring 550–600 parts of acetic acid of 10 per cent. strength. There are then added, either immediately after addition of the acetic acid, or after standing for a short or long period, 70–300 parts of benzylamine. During and after the addition of benzylamine, the mixture is thoroughly stirred or agitated. The product separates in the form of a finely divided precipitate either immediately, or shortly after the addition of the benzylamine, and is worked up in the manner described in the foregoing Examples.

The final product is soluble in dilute caustic alkali solution, for instance, in a caustic soda solution of 10 per cent. strength. Its solutions in alkali may be worked up into artificial materials, such as films, artificial silk, or the like, in the manner described in my application Ser. No. 727,802 filed July 23, 1924 and my application Ser. No. 111,037 filed May 22, 1926. These last two mentioned applications eventuated respectively into Patents Nos. 1,674,403 and 1,674,404.

*Example 4.*—1000 parts of a viscose of 10 per cent. strength (calculated on the parent cellulose), prepared as described in Example 1 of my above mentioned U. S. Patent No. 1,674,401, are treated with a saturated solution of common salt, whilst stirring, until precipitation occurs. The precipitated cellulose-xanthate is then separated from the mother liquor by filtering, straining, centrifuging, or the like, preferably after standing for several hours, and is then washed with a solution of common salt of 10–20 per cent. strength until the washings are colorless, or only faintly colored, and are neutral or only faintly alkaline towards phenolphthalein. The precipitate is then pressed; its weight after pressing is 600–900 parts. The pressed mass is then treated with about 5–10 times its weight of an aqueous solution of aniline of 2–3 per cent. strength, and kneaded or mixed until the cellulose-xanthate is at least partially dissolved. The mixture is then allowed to stand at room temperature, preferably whilst stirring, shaking or the like, either continuously or intermittently. After standing for several days (for about 3–6 days), the product of the reaction separates in the form of flakes, which are mixed with shining crystals (probably phenylurea or phenyl thiourea), particularly if a large excess of aniline has been used.

The product which separates is then freed from the mother liquor as in the preceding examples, washed, treated if desired with alcohol, or with alcohol and then with ether, benzene, or the like, and if necessary dried. It is soluble in dilute caustic alkali solution, for example, in a solution of caustic soda of 10 per cent. strength.

In this example, the reaction may be considerably accelerated by applying heat, for instance, by warming on the water-bath.

*Example 5.*—To 1000 parts of a viscose of

8–12 per cent. strength (calculated on the parent cellulose), having a caustic soda content of 2–8 per cent. by weight, there are added in small portions, whilst stirring or kneading, a solution of 30–200 parts of iodine in an aqueous solution of potassium iodide having a composition 40–250 parts potassium iodide and 300–2000 parts of water. The liquid becomes colored, and a flaky, powdery substance separates. The precipitate is thoroughly washed with water and is pressed until its weight is 800–1200 parts. The pressed substance is then mixed with 4000–6000 parts of an aqueous solution of aniline of 3 per cent. strength, and the mixture is well stirred. The mixture is then allowed to stand for several days at room temperature, whilst stirring or shaking continuously or intermittently, and the product is worked up in the manner described in the foregoing examples. The product is a flaky, powdery substance, soluble in dilute caustic alkali solution, for example, in a solution of caustic soda of 10 per cent. strength. An analysis gave the following results:—

| $C_6H_5 \cdot NH \cdot CS \cdot O \cdot (C_{12}H_{19}O_9) = C_{19}H_{25}NSO_{10}$ | Calculated for | Found |
|---|---|---|
| N | 3.05 | 3.07 |
| S | 6.97 | 7.24 |

Solutions of the substance in alkali solution may be worked up into artificial products such as films, artificial silk, or the like, or into layers or coatings, according to the processes described in my application Ser. No. 727,802 filed July 23, 1924 and my application Ser. No. 111,037 filed May 22, 1926.

*Example 6.*—The procedure is as in Example 5, with the exception that the treatment with the aniline occurs on the water-bath, whereby the duration of the process is considerably reduced. Thus the product may be isolated after a period of from several hours to 24 hours.

*Example 7.*—The procedure is as in Example 6, with the exception that instead of the aqueous solution of aniline there is used a solution of aniline in alcohol, and the mixture is heated on the water-bath in a reflux apparatus.

*Example 8.*—1000 parts of a viscose of 10 per cent. strength (calculated on the parent cellulose), prepared as described in Example 1 of my above mentioned U. S. Patent No. 1,674,401, and corresponding with 100 parts of parent cellulose, are diluted with 5000–7500 parts of water, and treated, whilst stirring, with dilute acetic acid of 10 per cent. strength, until the reaction is neutral, faintly alkaline, or faintly acid. There are then added, whilst shaking, 1500–3000 parts of a solution of potassium ferricyanide of 10 per cent. strength, whereupon a flaky precipitate separates. This precipitate is collected by filtration, straining centrifuging, or the like, either immediately after addition of the ferricyanide solution, or after standing for a short or long period, and is then thoroughly washed with water. After washing, the residue is pressed or centrifuged until its weight is 500–700 parts, and then mixed with 3000–10,000 parts of an aqueous solution of aniline of 3 per cent. strength; the mixture is shaken or stirred, whereupon swelling occurs. After about 24 hours the product has coagulated into flakes. It is then separated from the mother liquor by filtering, centrifuging, straining, or the like, either immediately, or after standing at room temperature for several days, and is then thoroughly washed with water, and is further worked up in the manner described in the foregoing examples. The product is soluble in alkali lye, for instance, in a caustic soda solution of 10 per cent. strength.

An analysis gave the following results:—

| $C_6H_5 \cdot NH \cdot CS \cdot O \cdot (C_{24}H_{39}O_{19}) = C_{31}H_{45}NSO_{20}$ | Calculated for | Found |
|---|---|---|
| C | 47.38 | 45.88 |
| H | 5.74 | 5.85 |
| N | 1.78 | 1.63 |
| S | 4.07 | 3.99 |

Solutions of the product in caustic alkali solution, for instance in a caustic soda solution of 8–10 per cent. strength, may be worked up into artificial products (for example films, artificial threads or the like), layers, coatings, or the like, in the manner described in my application Ser. No. 727,802 and my application Ser. No. 111,037 filed May 22, 1926.

*Example 9.*—The procedure is as in Example 8, with the modification that the reaction with the aniline occurs on the water-bath. At the commencement, there is a pronounced swelling, or even a partial or complete dissolution of the material, particularly when a sufficient quantity of the aqueous solution of aniline is used. Finally, however, the product separates and coagulates in the mother liquor, and may then be worked up as in the preceding example.

An analysis gave the following results:—

| $C_6H_5 \cdot NH \cdot CS \cdot O \cdot (C_{24}H_{39}O_{19}) = C_{31}H_{45}NSO_{20}$ | Calculated for | Found |
|---|---|---|
| C | 47.38 | 46.9 |
| H | 5.74 | 6.03 |
| N | 1.78 | 1.56 |
| S | 4.07 | 5.52 |

Solutions of the product in caustic alkali solution, for instance in a caustic soda solution of 8–10 per cent. strength, may be worked up into artificial products (for example films, artificial threads or the like), layers, coatings, or the like, in the manner described in my application Ser. No. 727,802, filed July 23, 1924, and my application Ser. No. 111,037 filed May 22, 1926.

The oxidizing agents, in examples 5 to 9 inclusive, for example oxidizing agents such as iodine and potassium ferricyanide, react with the cellulose xanthate and form cellulose diaxanthogenate. The cellulose dixanthogenate reacts with the aniline described in Examples 5 to 9, inclusive, and there results the same chemical compound referred to in lines 65-70 of page 1 and claim 3 of the United States patent to Harrison No. 1,684,732.

*Example 10.*—1000 parts of a viscose of 10 per cent. strength (calculated on the parent cellulose), prepared as described in Example 1 of my above mentioned U. S. Patent No. 1,674,401, are diluted with 10,000 parts of water, and treated whilst stirring with a dilute acid, for instance, acetic acid of 10 per cent. strength, until the reaction is neutral, faintly alkaline, or faintly acid, whereupon 100-200 parts of diethyl-sulphate are added whilst stirring or shaking. Shortly after the addition of the diethyl-sulphate there are added 30-200 parts of aniline, or the equivalent quantity of ortho-toluidine, aminophenol, or benzylamine, the stirring or shaking being continued.

Precipitation of the final product occurs after a shorter or longer interval of time according to the nature of the nitrogen-containing substance used. The precipitated product is separated from the mother liquor by filtering, centrifuging, straining or the like, and thoroughly washed with water, after which it may either be dissolved in the moist state, if desired after pressing or centrifuging, and put to the technical purpose for which it is intended, or it may first be dried, if desired after washing with alcohol, or with alcohol and then with ether, benzene, or the like. The product is soluble in dilute alkali solution, for instance, in a caustic soda solution of 8-10 per cent. strength, as well as in organic solvents, for example, aqueous pyridine.

Solutions of the product may be worked up into artificial products (for example, films, artificial threads or the like), layers, coatings, or the like, in the manner described in my application Ser. No. 727,802, filed July 23, 1924, and my application Ser. No. 111,037 filed May 22, 1926.

*Example 11.*—1000 parts of a viscose of 10 per cent. strength (calculated on the parent cellulose), prepared as described in Example 1 of my above mentioned U. S. Patent No. 1,674,401, and corresponding with 100 parts of parent cellulose are diluted with 500-10,000 parts of water, and treated with a dilute acid, for example, with acetic acid of 10 per cent. strength, until the reaction is neutral, faintly alkaline, or faintly acid. There are then added, whilst stirring or shaking, and if desired whilst cooling, 100-250 parts of ethyl iodide or the equivalent quantity of ethyl bromide, and the mixture is further stirred. There are then added, either soon after the addition of ethyl halide, or several hours later, 30-200 parts of aniline, or the equivalent quantity of ortho-toluidine, aminophenol, or benzylamine, and the mixture is further stirred or shaken. The precipitate which separates after a short or long period, is collected in a suitable filtering device or centrifuge, washed with water, and worked up in the manner described in the preceding example. The properties and solubilities of the product resemble those of the product obtained according to the preceding example.

*Example 12.*—To 1000 parts of a viscose of 10 per cent. strength, calculated on the parent cellulose (prepared as described in Example 1 of my above mentioned U. S. Patent No. 1,674,401, or by soaking sulphite-cellulose in 10-20 times its weight of caustic soda solution of 18 per cent. strength, pressing until the weight is twice that of the parent cellulose, thoroughly comminuting the mass and allowing it to ripen if desired for 2-3 days at room temperature, sulphidizing the mass with 10-25 parts of carbon-disulphide, per 100 parts of cellulose, and dissolving the product in water or in caustic soda lye of 5-8 per cent. strength, if desired whilst cooling below 0° C.), are added 50-100 parts of diethyl-sulphate, or the equivalent quantity of dimethyl-sulphate or ethyl iodide, whilst stirring vigorously. There are then added, either immediately or after several hours 30-150 parts of aniline or the equivalent quantity of ortho-toluidine, benzylamine or aminophenol, and the mixture is vigorously stirred or shaken. The product which is precipitated is worked up in the manner described in the preceding examples. It is soluble in dilute alkali solution, for instance, in a caustic soda solution of 8-10 per cent. strength. Solutions of the product may be worked up into artificial materials as referred to in the preceding examples.

*Example 13.*—100 parts of a viscose of 10 per cent. strength (calculated on the parent cellulose), prepared as described in Example 1 of my above mentioned U. S. Patent No. 1,674,401, are diluted with 2000-5000 parts of water, and if required, made neutral or faintly acid. There are then added whilst stirring or shaking energetically and preferably whilst cooling, 20-100 parts of ethyl chlorocarbonate, which may either be added in small portions, or be allowed to flow into the diluted viscose in a thin stream. The mixture shows a tendency towards gelatinization and stiffening which is greater the greater the quantity of ethyl chlorocarbonate used. Either immediately or several minutes after adding the ethyl chlorocarbonate, or in cases in which smaller quantities of the latter have been used, several hours after the addition, there are added 30-200 parts of aniline or the equivalent quantity of ortho-toluidine, aminophenol, benzylamine, or the like, and the mixture is vigorously stirred. According to the nature of the nitrogen-base used, the final product separates shortly after the addition of the base or only after several hours.

The precipitated product is freed from the mother liquor by filtering, centrifuging, straining or the like, and washed with water, after which it may be worked up in the manner described in the foregoing examples.

The final product is soluble in dilute alkali solution, for instance in a caustic soda solution of 8–10 per cent. strength.

Its solutions may be worked up into artificial products (for example films, artificial threads or the like), layers, coatings, or the like, in the manner described in my application Ser. No. 727,802 or my application Ser. No. 111,037 filed May 22, 1926.

In the foregoing examples there may be used instead of aromatic bases, primary or secondary aliphatic amines or hydroxy-amines, for example methylamine, ethylamine, amino-ethyl alcohol, or the like.

I claim:

1. A process for the manufacture of new cellulose compounds, which comprises acting on a cellulose compound which contains the group

except a cellulose-xantho-fatty acid or a compound thereof with a base derived from ammonia in which at least one hydrogen atom of the ammonia is replaced by an organic radical, and at least one hydrogen atom of the ammonia can still be replaced.

2. A process for the manufacture of new cellulose compounds, which comprises acting on a cellulose compound which contains the group

except a cellulose-xantho-fatty acid or a compound thereof with a base derived from ammonia in which at least one hydrogen atom of the ammonia is replaced by an aryl group, and at least one hydrogen atom of the ammonia can still be replaced.

3. A process for the manufacture of new cellulose compounds, which comprises acting on a cellulose compound which contains the group

except a cellulose-xantho-fatty acid or a compound thereof with an organic amine in which at least one hydrogen atom of the amino-group can be replaced.

4. A process for the manufacture of new cellulose compounds, which comprises acting on a cellulose compound which contains the group

except a cellulose-xantho-fatty acid or a compound thereof with an aromatic amine in which at least one hydrogen atom of the amino-group can be replaced.

5. A process for the manufacture of new cellulose compounds, which comprises acting on a cellulose compound which contains the group

except a cellulose-xantho-fatty acid or a compound thereof with aniline.

6. The process for the manufacture of new cellulose compounds which comprises reacting upon a cellulose compound which contains the

group except a cellulose-xantho-fatty-acid or a compound thereof with a derivative of ammonia of the type $$NH_{3-x}R_x$$

in which R may be an alkyl, aryl or aralkyl group and $x$ an integer less than 3.

7. The process for the manufacture of new cellulose compounds which comprises reacting upon a cellulose xanthogenate with a derivative of ammonia of the type $NH_{3-x}R_x$ in which R may be an alkyl, aryl or aralkyl group and $x$ an integer less than 3.

8. The process for the manufacture of new cellulose compounds which comprises reacting upon a cellulose xanthogenate in an approximately neutral aqueous medium with a derivative of ammonia of the type $NH_{3-x}R_x$ in which R may be an alkyl, aryl or aralkyl group and $x$ an integer less than 3.

9. The process for the manufacture of new cellulose compounds which comprises acting on a cellulose xanthogenate with a base derived from ammonia in which at least one hydrogen atom of the ammonia is replaced by an organic radical, and at least one hydrogen atom of the ammonia can still be replaced.

10. The process for the manufacture of new cellulose compounds which comprises acting on a cellulose xanthogenate with a base derived from ammonia in which at least one hydrogen atom of the ammonia is replaced by an aryl group, and at least one hydrogen atom of the ammonia can still be replaced.

11. The process for the manufacture of new cellulose compounds which comprises acting on a cellulose xanthogenate in an approximately neutral aqueous medium with an organic amine in which at least one hydrogen atom of the amino-group can be replaced.

12. The process for the manufacture of new cellulose compounds which comprises acting on a cellulose xanthogenate with an aromatic amine in which at least one hydrogen atom of the amino-group can be replaced.

13. The process for the manufacture of new cellulose compounds which comprises acting on a cellulose xanthogenate with aniline.

14. The manufacture of carbohydrate derivatives by subjecting to an oxidizing action in a substantially neutral medium a colloidal carbohydrate compound containing the CSS group and treating the carbohydrate derivative so formed with a nitrogen hydrogen compound in which at least one hydrogen atom is free.

15. The manufacture of carbohydrate derivatives by subjecting to an oxidizing action in a substantially neutral medium a colloidal carbohydrate compound containing the

group and treating the carbohydrate derivative so formed with an organic derivative of ammonia in which at least one hydrogen atom is free.

16. The manufacture of cellulose derivatives by subjecting a cellulose xanthogenate to an oxidizing action in a substantially neutral medium and treating the cellulose compound so formed with a nitrogen hydrogen compound in which at least one hydrogen atom is free.

17. The manufacture of carbohydrate derivatives by subjecting to an oxidizing action a colloidal carbohydrate containing the

group, except cellulose-xantho-fatty acids and compounds thereof, and treating the carbohydrate derivative so formed with a nitrogen hydrogen compound of the type of ammonia in which at least one hydrogen atom is free.

18. The manufacture of carbohydrate derivatives by subjecting to an oxidizing action in a substantially neutral medium a colloidal carbohydrate containing the

group, except cellulose-xantho-fatty acids and compounds thereof, and treating the carbohydrate derivative so formed with a nitrogen hydrogen compound of the type of ammonia in which at least one hydrogen atom is free.

19. The manufacture of carbohydrate derivatives by acting upon a carbohydrate containing the group

except cellulose-xantho-fatty acids and their compounds, with a basic compound of the type of ammonia containing nitrogen and hydrogen in which at least one hydrogen atom may be replaced.

20. The manufacture of carbohydrate derivatives by acting upon a carbohydrate containing the group

except cellulose-xantho-fatty acids and their compounds, with an amine in which at least one hydrogen atom of the nitrogen and hydrogen group may be replaced.

21. The manufacture of carbohydrate derivatives by reacting with a nitrogen hydrogen compound of the type of ammonia in which at least one hydrogen atom is free upon the carbohydrate product produced by subjecting a carbohydrate compound containing the

group to an oxidizing action in a substantially neutral medium.

22. The manufacture of carbohydrate derivatives by reacting with an organic derivative of ammonia in which at least one hydrogen atom is free upon the carbohydrate product produced by subjecting a carbohydrate compound containing the

group to an oxidizing action in a substantially neutral medium.

23. The manufacture of carbohydrate derivatives by reacting upon a carbohydrate dixanthogenate with a nitrogen hydrogen compound of the type of ammonia in which at least one hydrogen atom is free.

24. The manufacture of carbohydrate derivatives by reacting upon a carbohydrate dixanthrogenate with a base derived from ammonia in which at least one hydrogen atom of the ammonia is replaced by an organic radical and at least one hydrogen atom of the ammonia can still be replaced.

25. The manufacture of carbohydrate derivatives by reacting upon a carbohydrate dixanthogenate with an amine in which at least one hydrogen atom of the nitrogen hydrogen group can be replaced.

26. A carbohydrate derivative of diimido disulphide of the general formula

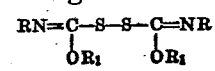

where R represents a radicle attached to a nitrogen atom and $R_1$ represents a residue of a colloidal carbohydrate.

27. A cellulose derivative of diimido disulphide of the general formula $$RN=C-S-S-C=NR$$
$$\phantom{RN=}|\phantom{-S-S-}|$$
$$\phantom{RN=}OR_1\phantom{-S-}OR_1$$

where R represents a radicle attached to a nitrogen atom and $R_1$ represents a residue of cellulose.

In testimony whereof I affix my signature.

LEON LILIENFELD.